Patented Mar. 10, 1936

2,033,118

UNITED STATES PATENT OFFICE 2,033,118

PROCESS OF PREPARING STABLE SULPHURIC ACID ESTERS OF LEUCO DERIVATIVES OF VAT DYESTUFFS

Wilhelm Bauer, Leverkusen-Wiesdorf, Bernhard Bollweg, Leverkusen, and Ludwig Zeh, Leverkusen-Wiesdorf, Germany, assignors, by mesne assignments, to Durand & Huguenin A.-G., Basel, Switzerland, a corporation of Switzerland No Drawing. Application April 13, 1931, Serial No. 529,892. In Germany May 14, 1930

6 Claims. (Cl. 260—49)

The present invention relates to a process of preparing stable sulphuric acid esters of leuco derivatives of vat dyestuffs.

In U. S. A. Patent 1,448,251 there is described a process for the manufacture of ester-like, water soluble compounds of vat dyestuffs by causing leuco compounds of the latter to react with sulphur trioxide or agents being capable to split off sulphur trioxide, in the presence of a tertiary organic base.

In accordance with the present invention the same products are obtained in a considerably simpler manner and without isolating the leuco derivatives. The method of working according to the invention is by reducing the vat dyestuffs by means of hydrogen sulphide in an appropriate tertiary organic base in the presence or absence of a suitable organic solvent or diluent being inert to the starting materials, causing sulphur trioxide or an agent containing sulphur trioxide or being capable of splitting off the latter under the conditions of working, to react upon the reaction mixture obtained in the above reduction process and, if desired, converting the esters being formed into soluble salts in the usual manner.

The more detailed method of working will be as follows:—

The dyestuff to be transformed into a water soluble ester, is suspended in a tertiary organic base, preferably a tertiary heterocyclic base or a hydrogenated tertiary isocyclic base, such as pyridine or a homologue thereof, quinoline, hexahydrodimethylaniline etc. Hydrogen sulphide is then passed through the mixture at normal or slightly elevated temperature, say, between about 10 and about 50° C., until the conversion of the starting dyestuff into its leuco derivative is complete, that is, until the original coloration of the dyestuff has disappeared, and the reaction mass has become nearly colorless. Instead of leading the hydrogen sulphide through the reaction mixture, a solution of the same in a tertiary organic base may be applied.

To the reaction mixture thus obtained an esterifying agent is added. As esterifying agents may be applied sulphur trioxide or agents containing sulphur trioxide or being capable of splitting off the latter under the conditions of working, such as chlorosulphonic acid, esters thereof, fuming sulphuric acid etc., and it may be mentioned that we generally prefer to apply the esterifying agent in admixture with a tertiary organic base. The esterifying agents are advantageously applied in such an amount that more than two molecular proportions of sulphur trioxide are available on one molecular proportion of the leuco derivative of the vat dyestuff to be esterified. Esterification already performs at low temperatures, but slightly elevated temperatures are likewise operable and tend to accelerate the esterification process. Generally, we prefer to apply temperatures between about 10 and about 70° C. The sulphuric acid esters are thus obtained in form of their salts with the tertiary base applied. The reaction mixture is best worked up by adding an alkali, such as sodium or potassium carbonate to the reaction mixture, whereby an alkali metal salt of the ester is formed, distilling off the tertiary base in vacuo or by steam distillation, dissolving the residue in water, filtering and salting out.

According to another feature of the invention the reduction and esterification may be performed in the following manner:—

The vat dyestuff is suspended in a tertiary organic base, particularly a tertiary heterocyclic base or a hydrogenated tertiary isocyclic base, an esterifying agent, such as sulphur trioxide, fuming sulphuric acid, chlorosulphonic acid or an ester thereof is added, advantageously in admixture with a tertiary organic base, and hydrogen sulphide is led through the reaction mixture, care being taken that the temperature not substantially surmounts about 25° C. As an alternative, the dyestuff may be added to a mixture of a tertiary organic base and an esterifying agent of the kind above referred to and the mixture caused to be reacted upon by hydrogen sulphide as described above. As soon as the reduction of the vat dyestuff is complete, the flow of hydrogen sulphide is stopped, and the reaction mixture is stirred, advantageously while heating to about 30 to about 70° C. in order to accelerate the esterification process, but it may be mentioned that the total process (reduction and esterification) may be performed at normal temperature.

This latter method of working is considered an equivalent to the method of working described before.

It should be stated that in all cases the presence of water and of oxygen (air) is to be avoided as far as possible.

The following examples illustrate our invention, without, however, restricting it thereto, the parts being by weight:—

*Example 1*

262 parts of indigo are stirred with twice the weight of pyridine. A solution of 34 parts of hydrogen sulphide in pyridine is added in the absence of oxygen and the whole is stirred until the reduction is complete. Obviously, the indigo can also be stirred with more pyridine and hydrogen sulphide be led in in the gaseous form. 400 parts of chlorosulphonic acid methyl ester are run slowly into the well cooled reaction mass and the temperature is raised gradually to 60-65° C. The process can also be carried out by first producing the esterification mixture by dropping 400 parts of chlorosulphonic acid methyl ester into 2500 parts of pyridine and introducing into this mixture with exclusion of oxygen the leuco compound produced in a separate vessel as above indicated. The leuco sulphuric acid ester of indigo thus produced in a satisfactory yield is converted into its alkali salt and isolated in the known manner.

Example 2

420 parts of 5,5'-dibromo-indigo are reduced with a solution of 34 parts of hydrogen sulphide in 1000 parts of pyridine and caused to react with an esterification mixture consisting of 400 parts of chlorosulphonic acid methyl ester and 2500 parts of pyridine. The working up is carried out in the customary manner. The leuco ester of dibromoindigo can be isolated from the reaction mixture in a very satisfactory yield.

Example 3

407 parts of the black dyestuff described in the example of British Patent 205,790, obtainable by condensation of beta-naphthisatin-alpha-chloride with alpha-anthrol and subsequent treatment of the reaction product with sulphuryl chloride, are converted by treatment at room temperature with 68 parts of hydrogen sulphide into the leuco compound (soluble in anhydrous pyridine with a yellowish coloration) and esterified with an esterifying mixture consisting of 800 parts of chlorosulphonic acid methyl ester and 4000 parts of pyridine. On working up the mixture the leuco ester (which is easily isolated by salting out the sodium salt) is obtained in a very good yield in the form of a greenish yellow crystalline powder.

Example 4

When the dyestuff of Example 3 is replaced by 296 parts of thioindigo and the process is carried out otherwise in the manner above described, there is obtained in a very satisfactory yield the potassium salt of the leuco thioindigo disulphuric acid ester, which crystallizes in colorless leaflets.

Other vat dyestuffs, such as anthanthrone, dimethoxy-dibenzanthrone, 3, 4, 8, 9-dibenzopyrenequinone, dinaphthalene-dioxide-quinone (obtainable in accordance with British Specification 298640,) can also be converted by the new process into the respective sulphuric acid esters.

Example 5

466.5 parts of the green dyestuff of British Patent No. 289154 (obtained from bromo-1-chloro-2, 3-naphthisatin-alpha-chloride by condensation with 4-methoxy-1-naphthol) are reduced with a cold solution of 90 parts of hydrogen sulphide in 1500 parts of pyridine. The reduction proceeds almost immediately accompanied by a yellow coloration of the solution. The excess of hydrogen sulphide is removed as far as possible by hydrogen gas and the leuco compound is forced by means of hydrogen into a mixture of 2500 parts of pyridine and 700 parts of chlorosulphonic acid. After heating for two hours to 35-40° C. with the exclusion of air, the reaction mass is poured into a solution of 1200 parts of sodium carbonate in water and the pyridine is removed by steam distillation. The remaining solution is filtered and the ester salt is separated by the addition of sodium chloride.

Example 6

585 parts of tetrabromoindigo are stirred into a mixture of 127 parts of N-diethyl-cyclohexylamine and about 3500-4000 parts of dimethylaniline. Hydrogen sulphide is led through the mixture, until reduction to the leuco tetrabromoindigo is complete, and to the reaction mixture thus obtained a mixture of 2000 parts of chlorobenzene, 1000 parts of dimethylaniline and 500 parts of chlorosulphonic acid is added. Esterification is completed by slightly heating the reaction mixture and the ester thus obtained is isolated in the usual manner in form of its sodium salt.

Example 7

405 parts of the blue dyestuff of the formula:—

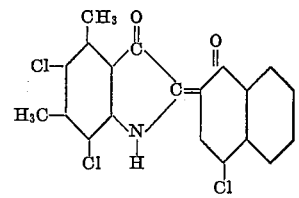

are reduced by means of hydrogn sulphide at a temperature of about 20° C. in the presence of 2000 parts of dimethylaniline and 600 parts of pyridine. The yellow leuco derivative being formed dissolves to the greatest part, and after the completion of the reduction process the reaction mixture is stirred into a mixture of 600 parts of chlorosulphonic acid and 3000 parts of pyridine while excluding air. The temperature is slowly raised to 40-50° C. and the reaction mixture stirred for about one hour. After that the mixture is poured into 2500 parts of aqueous caustic soda solution of 30% strength and the pyridine distilled off by steam distillation. Air is blown through the remaining liquid which is then filtered and salted out by means of sodium chloride.

Example 8

375 parts of anthraquinone-1, 2-naphthacridone are stirred into about 3750 parts of pyridine, 37.5 parts of hexahydrodiethylaniline are added and hydrogen sulphide is led through the mixture until reduction is complete. A yellowish-red solution of the leuco derivative of the starting material is thus obtained which is poured at normal temperature into a mixture of 600 parts of chlorosulphonic acid and 2000 parts of pyridine. Esterification is completed while slowly heating to 40-50° C. The greatest part of the pyridine is distilled off in vacuo, the residue, containing the pyridine salt of the leuco ester is diluted with water and the pyridine salt transformed into the yellow sodium salt of the ester by means of an aqueous sodium carbonate solution.

Example 9

361 parts of 4, 4'-dichloro-dianilidobenzoquinone are reduced by means of hydrogen sulphide in the presence of 3600 parts of pyridine and 36 parts of hexahydrodiethylaniline while stirring and the reaction mixture is esterified by means of a mixture of 600 parts of chlorosulphonic acid and 2000 parts of pyridine. After working up, the sodium salt of the ester being formed is obtained in compact yellow leaflets.

*Example 10*

296 parts of thioindigo are stirred into an esterification mixture consisting of 900 parts of chlorosulphonic acid or 900 parts of chlorosulphonic acid methylester and 3600 parts of pyridine and the whole is cooled to 15° C. A cold solution of 68 parts of hydrogen sulphide in pyridine is then added while thoroughly stirring. The reduction of the dyestuff is complete in a short time, and examination of a test portion will show that esterification has already begun. It is carried to completion by heating slowly to 40° C. with exclusion of air. The acid sulphuric acid ester of the leuco thioindigo, which is produced in a satisfactory yield, is isolated in the form of the sodium salt in the known manner.

*Example 11*

1600 parts of chlorosulphonic acid are stirred into 8000 parts of pyridine while cooling. When the reaction is complete, 420 parts of 5,5'-dibromoindigo are added and a slow current of hydrogen sulphide is passed in at 15-20° C. As soon as a pale bluish green colored solution has been produced, the supply of hydrogen sulphide is interrupted and the esterification is carried to completion by heating slowly to 50° C. in a current of an indifferent gas. The mass is then stirred into an aqueous solution of 2300 parts of sodium carbonate and the pyridine is removed by steam distillation. The ester is isolated from the weakly alkaline filtrate by salting out with sodium chloride.

*Example 12*

Into a mixture, made up at 0–10° C., of 3000 parts of pyridine and 580 parts of chlorosulphonic acid, 200 parts of 5',7'-dibromo-2-indol-2-thionaphtheneindigo are introduced at 15–20° C. and stirred thoroughly. A gentle current of hydrogen sulphide is then passed in, until the dyestuff is reduced with formation of the leuco compound. The mixture is stirred for one hour longer at 20° C. passing in hydrogen sulphide gas from time to time, then heated slowly to 40–45° C. and maintained at this temperature for about one hour until the esterification is complete with the formation of a homogenous solution. This is then poured into 4500 parts of 15% caustic soda solution and the pyridine is removed by steam distillation. Only traces of unchanged dyestuff are present in the liquor, which are removed by filtration. The ester is salted out by means of sodium chloride. By recrystallization from water with the addition of a little sodium carbonate the sodium salt of the ester is obtained as a white mass.

*Example 13*

Hydrogen sulphide gas is passed into a mixture of 4000 parts of pyridine, 1050 parts of chlorosulphonic acid and 405 parts of the blue dyestuff of the formula:—

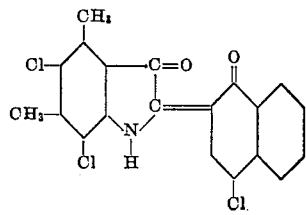

at 15° C., until the dyestuff is completely reduced. The current of gas is then turned off and the esterification is carried to completion by stirring for one hour at 20° C. and then by slowly raising the temperature to 35–40° C. The ester is obtained by pouring the reaction mixture into 9000 parts of 15% caustic soda solution and removing the pyridine by steam distillation. The ester is salted out from the filtrate by means of sodium chloride. Instead of passing in hydrogen sulphide in the gaseous form a solution of hydrogen sulphide in pyridine (for example, 100 parts of hydrogen sulphide in 2000 parts of pyridine) can be added and the dyestuff reduced and esterified as above.

We claim:—

1. Process which comprises reducing a vat dyestuff with hydrogen sulphide in the presence of a tertiary organic base, and esterifying the reaction product without isolating it with an esterifying agent of the group consisting of sulphur trioxide, agents containing free sulphur trioxide and agents being capable of splitting off sulphur trioxide under the conditions of working, the total process being performed under substantially anhydrous conditions and in the absence of free oxygen.

2. Process which comprises reducing a vat dyestuff with hydrogen sulphide in the presence of a compound of the group consisting of tertiary heterocyclic bases and hydrogenated tertiary isocyclic bases at a temperature between about 10 and about 50° C., and esterifying the leuco derivative of the vat dyestuff thus obtained without isolating it with an esterifying agent of the group consisting of sulphur trioxide, agents containing free sulphur trioxide and agents being capable of splitting off sulphur trioxide under the conditions of working, the esterification being performed at a temperature between about 10 and about 70° C. and the total process being performed under substantially anhydrous conditions and in the absence of free oxygen.

3. Process which comprises reducing an indigoid vat dyestuff with hydrogen sulphide in the presence of pyridine at a temperature between about 10 and about 50° C. and esterifying the leuco derivative of the vat dyestuff thus obtained without isolating it with a compound of the group consisting of chlorosulphonic acid and methyl esters thereof, the total process being performed under substantially anhydrous conditions and in the absence of free oxygen.

4. The process which comprises reducing dimethoxy-dibenzanthrone with hydrogen sulphide in the presence of pyridine at a temperature between about 10 and about 50° C. and esterifying the leuco derivative of dimethoxydibenzanthrone thus obtained with a compound of the group consisting of chlorosulphonic acid and methyl esters thereof, the total process being performed under substantially anhydrous conditions and in the absence of free oxygen.

5. The process which comprises reducing 3,4,8,9-dibenzopyrene quinone with hydrogen sulphide in the presence of pyridine at a temperature between about 10 and about 50° C. and esterifying the leuco derivative of 3,4,8,9-dibenzopyrene quinone thus obtained with a compound of the group consisting of chlorosulphonic acid and methyl esters thereof, the total process being performed under substantially anhydrous conditions and in the absence of free oxygen.

6. The process which comprises reducing tetrabromoindigo with hydrogen sulphide in the presence of pyridine at a temperature between about 10 and about 50° C. and esterifying the leuco derivative of tetrabromoindigo thus obtained with a compound of the group consisting of chlorosulphonic acid and methyl esters thereof, the total process being performed under substantially anhydrous conditions and in the absence of free oxygen.

WILHELM BAUER.
BERNHARD BOLLWEG.
LUDWIG ZEH.